United States Patent [19]

Parker

[11] Patent Number: 4,630,445
[45] Date of Patent: Dec. 23, 1986

[54] WASTEGATE VALVE FOR INTERNAL COMBUSTION ENGINE TURBOCHARGER

[75] Inventor: John Parker, Huddersfield, England

[73] Assignee: Holset Engineering Company Limited, Turnbridge, England

[21] Appl. No.: 712,950

[22] Filed: Mar. 15, 1985

[30] Foreign Application Priority Data

Mar. 16, 1984 [GB] United Kingdom ............ 8406859

[51] Int. Cl.⁴ .............................................. F02B 37/00
[52] U.S. Cl. .................................... 60/602; 137/339; 251/64
[58] Field of Search ............ 60/602; 123/41.41, 41.77, 123/41.85; 137/339, 340; 251/25, 50, 64, 337

[56] References Cited

U.S. PATENT DOCUMENTS

| | | | |
|---|---|---|---|
| 2,112,045 | 3/1938 | Puffer | 123/41.85 |
| 3,270,951 | 9/1966 | Reed | 60/602 |
| 3,799,139 | 3/1974 | Kuhn | 123/41.85 X |
| 4,075,849 | 2/1978 | Richardson | 60/602 |
| 4,250,710 | 2/1981 | Matsuoka et al. | 60/602 |

FOREIGN PATENT DOCUMENTS 3009453 9/1981 Fed. Rep. of Germany ........ 60/602

Primary Examiner—Michael Koczo
Attorney, Agent, or Firm—Gary M. Gron; Robert T. Ruff

[57] ABSTRACT

The disclosure illustrates a wastegate valve for an internal combustion engine turbocharger comprising a valve head carried by a valve stem and arranged to cooperate with a valve seat in a bypass passage, the valve stem being mounted in a valve guide for movement between a position in which the valve head and valve seat cooperate to close the valve and a position in which the valve head is spaced from the valve seat. A shield formed from a cup shaped thin wall pressing is provided at least partly surrounding the valve stem in a region thereof exposed to heat from the exhaust gases, the shield being disposed so as to deflect hot exhaust gases away from that part of the stem surrounded by the shield. Passageways are provided for conducting a flow of cooling fluid to said valve stem in between a pair of spaced valve guide inserts in at least part of the region surrounded by the shield.

6 Claims, 5 Drawing Figures

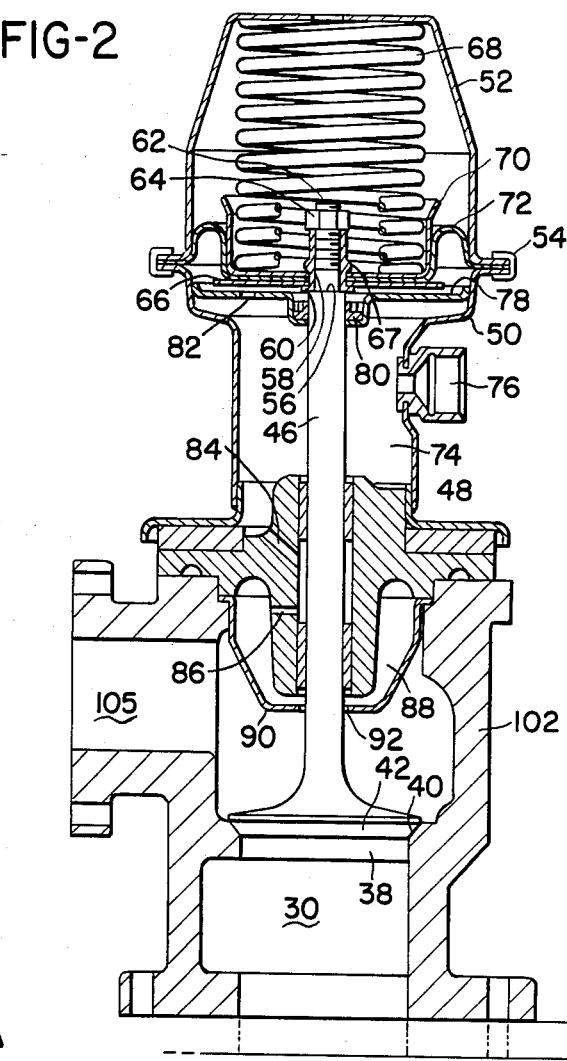
FIG-2
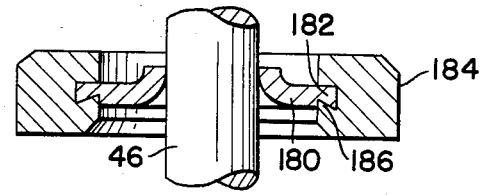
FIG-3A
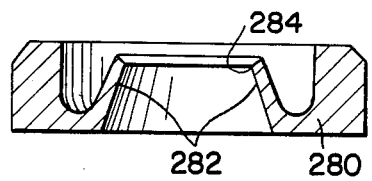
FIG-3B
FIG-3C

WASTEGATE VALVE FOR INTERNAL COMBUSTION ENGINE TURBOCHARGER

The present invention relates to turbochargers for internal combustion engines and more specifically to turbochargers including a pressure relief or wastegate valve.

A turbocharger for an internal combustion engine comprises a compressor and a turbine driven by exhaust gas from the internal combustion engine. The turbine rotor is mechanically connected to the compressor rotor, so that rotation of the turbine rotor causes the compressor rotor to rotate and thus supply high pressure charge air to the internal combustion engine. One problem of such turbochargers is that the rotational rpm of the turbine rotor and thus of the compressor rotor increases with the rpm and/or load of the engine. At high engine operating rpm's or loads, the turbine and compressor may therefore be driven at excessive rpm's. It is also possible that the compressor may supply charge air to the engine at pressures higher than the engine cylinders can withstand. Devices have been incorporated into turbochargers so as to operate when the engine speed or load exceeds a certain level. These devices in general comprise some form of pressure relief valve (known as a wastegate valve) which enables at least a part of the engine exhaust gases to bypass the turbine as and when the engine speed or load reaches a predetermined figure. One type of wastegate valve is a so-called poppet valve, in which the valve comprises a valve head for cooperation with a valve seat, the valve head being carried by a valve stem mounted in a valve guide. A spring is provided to bias the valve into a closed position. Such an arrangement is described and illustrated in U.K. Patent Specification No. 1,043,112. The valve head is exposed to pressure of the exhaust gas upstream of the turbine itself in such a way that pressure of the exhaust gas acts on the poppet valve in a direction to open the valve. Thus, when the pressure of the exhaust gas exceeds the pressure of the spring, the valve opens and a portion of the exhaust gas bypasses the turbine thus limiting further increase in rpm of the turbine and compressor.

In a variation of such an arrangement the end of the valve stem remote from the valve head is attached to a pressure plate and diaphragm which divide the valve housing into two chambers. One chamber contains the spring which biases the valve towards the closed position and the second chamber is connectible to a source of pressurized fluid, the diaphragm being sized such that the valve is opened at a predetermined fluid pressure. The fluid may be supplied from any convenient source but is usually discharge air from the turbocharger compressor.

One problem which arises out of the use of both such types of poppet valves, however, is that at least the valve head is exposed to the very high temperatures of the exhaust gas and becomes extremely hot. The heat tends to flow back along the stem to the diaphragm, when present, and spring. Such overheating can cause (i) reduction in life of the diaphragm, when present, and (ii) stress relaxation of the spring resulting in changes to the spring preload and hence operating point of the valve.

It has been proposed in U.S. Pat. No. 3,270,951 to utilize a heat shield in order to impede flow of heat to the valve stem, but this merely acts as a heat bearier rather than a means to carry away heat. U.S. Pat. No. 4,075,849 is an example of pressurizing a valve stem to prevent flow from the turbine inlet passage to the control chamber, but it does not provide a positive flow of coolant along the valve stem.

In accordance with the present invention the above problems are solved by a wastegate valve assembly for the turbine of a turbocharger, the valve assembly comprising a valve head carried by a valve stem and arranged to cooperate with a valve seat in an exhaust gas flow path around the turbine, said valve stem being mounted in a valve guide means for movement between a first position in which said valve head and said valve seat cooperate to close the valve and a second position in which the valve head is spaced from the valve seat, a shield means being provided at least partly surrounding the valve stem in a position to shield the stem from the hot exhaust gases, said shield means being disposed so as to deflect (in operation) hot exhaust gases away from that part of the stem surrounded by said member, and means being provided for conducting a flow of cooling fluid to said valve stem in at least part of the portion thereof that is surrounded by said shield means.

The invention will now be further described with reference to the accompanying drawings in which:

FIG. 2 shows an alternative mounting for a poppet type valve in accordance with the present invention.

FIGS. 3A, 3B and 3C show various alternative designs of seal which may be used in the wastegate valve of the present invention.

Figure 1:
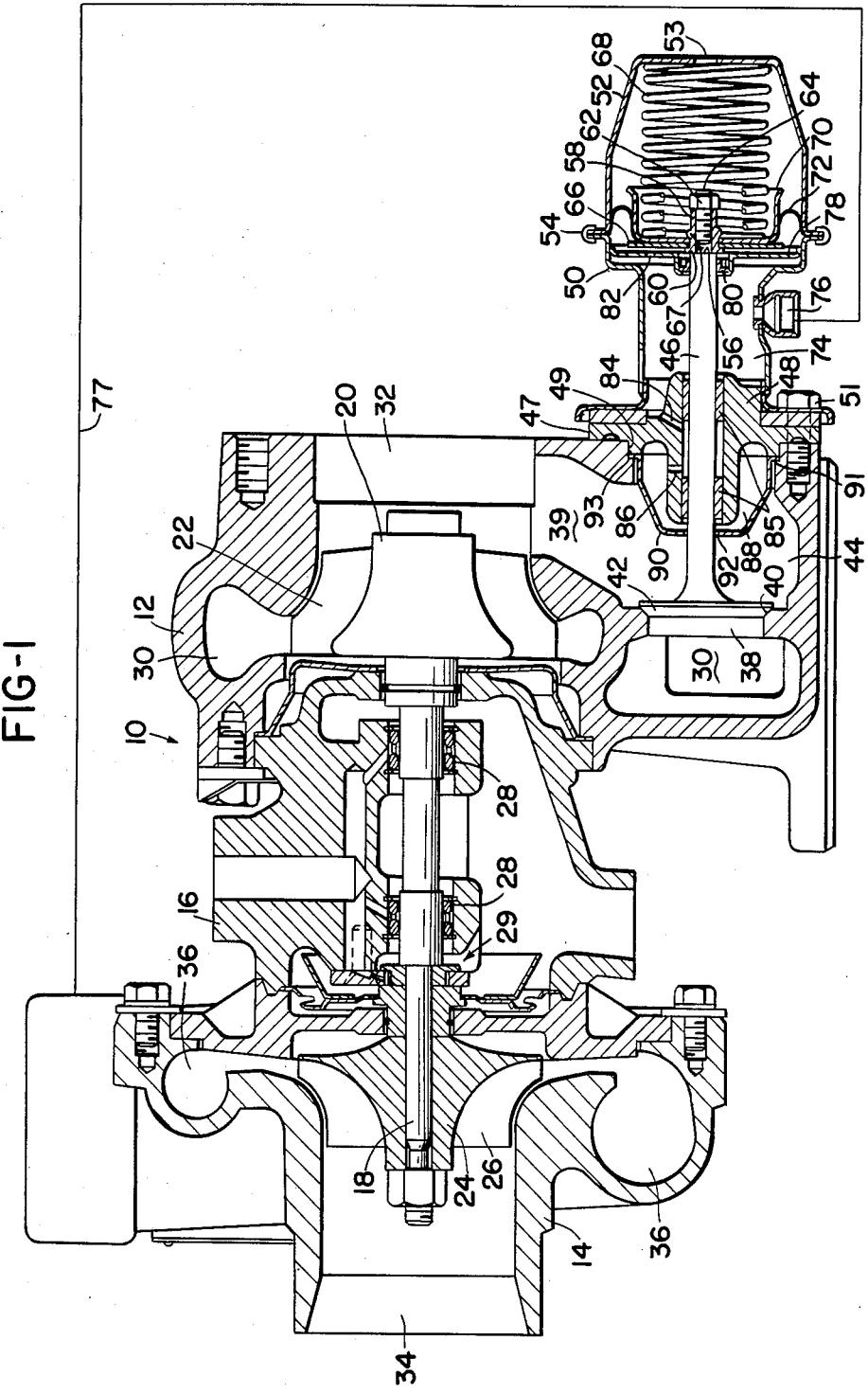
FIG. 1 illustrates partly in section a turbocharger including a wastegate valve of the poppet type in accordance with the present invention.

Referring to FIG. 1, there is shown a turbocharger generally indicated as 10 and comprising a turbine housing portion 12, a compressor housing portion 14 and a bearing housing portion 16. Mounted on a central shaft 18 and within the turbine housing portion 12 is a turbine wheel or rotor 20 having a plurality of vanes 22. Also mounted on shaft 18 and within the compressor housing portion 14 is a compressor impeller or rotor 24 having a plurality of vanes 26. The shaft 18 is rotatably mounted in floating sleeve bearings 28 and a thrust bearing 29 within the bearing housing 16 portion. The turbine housing portion 12 has a passageway 30 leading from the exhaust outlet (not shown) of an internal combustion engine (not shown) to the turbine wheel 22. The open end of the turbine housing 12 provides a discharge passageway 32 for exit of spent exhaust gases from the turbine wheel 22 to pass to the exhaust system and thus to atmosphere. The compressor housing portion 14 includes an inlet passageway 34 through which air is drawn into the compressor and a passageway 36 leading from the compressor rotor 24 to the inlet manifold (not shown) of the internal combustion engine (not shown). An opening 38 is formed in the turbine housing passageway 30 and communicates with a bypass passageway 39, which leads around the turbine wheel 22 to the discharge passageway 32 or to the atmosphere. Opening 38 is formed with an annular valve seat 40 which cooperates with a circular valve head 42 of a poppet valve 44. The valve head 42 is carried by a valve stem 46 which is reciprocally mounted in a valve guide 48.

The valve guide 48 includes an integral flange 47 mounted around the periphery of a hole 49 in the turbine housing portion 12 by means of bolts 51 (only one of which is shown).

The poppet valve arrangement is carried within an annular housing 50 mounted over the flange 47, also by bolts 51. The housing 50 includes a cover portion 52 having a vent hole 53 and attached to the remainder of the housing by an annular clip member 54. Towards the end of the valve stem 46 remote from the valve head 42 a shoulder 56 is formed which cooperates with a sleeve 58 telescopically mounted over the end of the valve stem 46. The sleeve 58 includes an annular flange 60 located adjacent the shoulder 56, and the sleeve 58 is held in position against the shoulder 56 by means of a nut 62 threaded onto a threaded portion 64 at the end of the valve stem 46. A pressure plate 66 abuts against the flange 60 and is retained in position by virtue of a swaged collar 67 formed in the sleeve 58. Also retained on the sleeve 58 by the swaged collar 67 is a cup-like member 70 which serves to retain and centralize a return spring 68 about the axis of the valve stem 46. Spring 68 abuts the inside of cover member 52 at the opposite end to the end seated in cup 70 and thereby applies pressure to the valve stem via plate 66, flange 60 and shoulder 56 and thereby biases the valve head 42 into sealing arrangement with valve seat 40. The flexible annular diaphragm 72 is held at its outer diameter between cover 52 and the remainder of the housing 50 and its inner diameter between pressure plate 66 and cup-like member 70. The diaphragm forms one wall of a pressure chamber 74 which receives fluid under pressure via inlet connection 76. Such fluid under pressure is provided from an outlet from the compressor via conduit 77 or from the engine inlet manifold. The fluid pressure is such that the pressure within the pressure chamber 74 is greater than pressure in the passageway 39 and exhaust gases are thus prevented from passing into the chamber 74 through the valve guide 48. The pressure chamber 74 is divided into two further chambers by an annular member 78 attached at its outer periphery to the wall of the housing 50 and at its inner periphery carrying an annular seal member 80 of approximately U-shaped cross section configuration. A restricted orifice or bleed hole 82 is formed in member 78 allowing restricted flow of fluid between the two chambers formed by the member 78.

Valve guide 48 includes passageways 84 and 86 on opposite sides of flange 47 which enable fluid under pressure to pass from pressure chamber 74 through passage 84 and into contact with the valve stem 46 within the valve guide 48 between a pair of sleevelike valve guide inserts 85. The fluid then passes through passageway 86 to a chamber 88 defined by a cup shaped thin wall shield 90 and surrounding part of the valve guide 48 and the valve stem adjacent the valve guide. The heat shield 90 has a flange 91 held against a shoulder 93 in hole 49 by flange 47. Shield 90 includes an opening 92 which is larger than the diameter of the valve stem 46 thereby allowing fluid to escape from chamber 88 into the passageway 39.

In operation, the turbocharger receives exhaust gases from the internal combustion engine which pass via passageway 30 to the turbine rotor 20 and exit through passageway 32. This causes the turbine rotor 20 to rotate and in turn causes the compressor rotor 24 to rotate thereby drawing air in through inlet 54 and feeding the air at increased pressure to the internal combustion engine. As the engine speed and/or load increases so the pressure in the passageway 30 increases until the combined pressure of the exhaust gas in passageway 30 and the fluid in pressure chamber 74 exceeds the pressure exerted by the spring 68, at which time the valve 42 is caused to move to the right as shown in the drawing, away from the valve seat 40 allowing exhaust gases to pass through the orifice 38 and bypass the turbine.

In conventional wastegate valves for turbochargers, difficulties arise due to the high temperature of the exhaust gases which come into contact with the valve head and which are thus transmitted from the valve head along the valve stem. In the arrangement shown in the embodiment of FIG. 1, such transmission of heat along the valve stem is reduced or prevented because of the heat shield 90 which keeps or deflects hot exhaust gases away from the valve guide 48 and part of the valve stem and secondly by virtue of pressurized cooling fluid being fed via passageways 84 and 86 to portions of the valve stem 46 and thus acting as a cooling fluid and barrier between the inside surface of shield 90 and the valve guide 48. Such pressure fluid/cooling fluid is also kept close to the valve stem by virtue of the heat shield 90.

Referring now to FIG. 2, there is shown a wastegate valve identical with that of FIG. 1, but mounted to the engine exhaust manifold 100, by means of separate mounting member 102 by means of suitable fasteners (not shown). In this arrangement the opening 30 and the valve seat 40 are formed in this separate mounting member 102 and the wastegate valve is mounted against a hole 103 in the mounting member 102. The operation of the arrangement is the same as FIG. 1 except that when the valve is opened, exhaust gases are diverted at an earlier stage in their progress to atmosphere via passageway 105.

Turning now to FIGS. 3A, 3B and 3C there are shown three separate shapes of seal 80. In the arrangement of FIG. 3A the seal is indicated as 180 and in this arrangement the seal is initially in the form of an annular ring with an internal diameter less than the diameter of the valve stem 46 and mounted in an inner groove 182 of a mounting ring 184 by means of a staking or rolling operation at 186. During assembly the valve stem 46 is forced through the seal 180 resulting in the seal 180 being deformed to adopt the position shown in the drawing. The material from which the member 180 is made is such that the seal 180 bears on the valve stem allowing movement on the valve stem whilst damping such movement. An example of such material is Polytetraflouroethylene (PTFE). The seal of this arrangement is such that it operates without the need for fluid pressure on the spring side of the seal (i.e. the top as shown in the drawing). However, such pressure may be utilized if required.

In the arrangement shown in FIG. 3B, the seal is in the form of an annular ring 280 of approximately U-shaped section. One arm 282 of U-shaped seal 280 is pressed into contact with the valve stem (not shown in this arrangement) by virtue of the shape of the seal having an inner diameter 284 less than the outer diameter of the stem and also by virtue of the pressure of fluid within the U-shape and therefore forcing the arm 282 against the valve stem. The shape of the seal 280 is such that any pressure of the fluid trying to force the arm 282 away from the valve stem is less than pressure forcing the arm 282 into contact with the valve stem 46 during dynamic conditions.

In the arrangement shown in FIG. 3C, the seal 380 comprises an annular member having an annular projection 382 formed thereon and shaped so as to press against the valve stem 46 (not shown) because the inner diameter 384 is less than the outer diameter of the stem 46. Furthermore, the fluid pressure forces the projection 282 in the direction of the arrow forcing the projection 382 further against the valve stem to dampen movement thereof. The seal 380 is shaped such that pressure forcing the projection away from the valve stem 46 is less than the fluid pressure forcing the projection 382 against the valve stem during dynamic conditions.

It will be appreciated that many modifications of the arrangement shown in the drawings may be effected. For example, many other different shapes of seal may be used and the wastegate valve may be placed in many other different positions. Also the cover portion 52 may be sized and shaped so as to contact at least part of the sides of the coil spring 68 thereby causing additional damping.

Having thus described the invention, what is claimed as novel and desired to be secured by Letters Patent of the United States is:

1. A wastegate valve assembly for a turbine mounted for rotation within a turbocharger housing having an inlet passage for delivering hot exhaust gases to said turbine, said valve assembly comprising:
   means for defining an exhaust gas flow path around said turbine, said flow path means including a valve seat;
   a valve head carried by a valve stem;
   a valve guide means slideably mounting said valve stem for movement between two positions, the first of which causes said valve head to engage said valve seat and block flow through said flow path means and the second of which permits flow through said flow path means thus bypassing said turbine;
   a shield means surrounding said valve stem and positioned to shield said stem from hot exhaust gas passing through said bypass flow path means; and,
   means for conducting a flow of cooling fluid to the valve stem in at least part of the portion thereof that is surrounded by said shield means and to the interior of said shield means and to the exterior of said shield means in sufficient quantity to cool the valve stem and provide a barrier between the shield means and said valve guide means.

2. Apparatus as in claim 1 wherein said shield means comprises a cup shaped thin wall pressing having an opening through which the valve stem passes, said cup shaped pressing being positioned over the valve guide means and the opening being larger than the valve stem to allow cooling fluid to escape only from the opening in the cup shaped pressing into the exhaust gas flow path means.

3. Apparatus as in claim 2 wherein said cooling flow conducting means comprises
   means for forming an annular chamber surrounding the valve stem within said valve guide means, and,
   means for defining a first passage for cooling fluid to said annular chamber and a generally radially outward means for defining a second passage for cooling fluid from said annular chamber through the valve guide means to the interior side of said cup shaped pressing.

4. Apparatus as in claim 3 wherein said annular chamber means comprises a pair of spaced sleevelike valve guide inserts received in said valve guide means, said valve stem extending through said valve guide inserts.

5. Apparatus as in claim 4 further comprising:
   actuating means connected to said stem for displacing said stem and head between the two positions, said actuating means being energized by fluid under pressure; and,
   means for connecting the actuating fluid to said first passage means whereby the actuating fluid is employed to cool said stem.

6. Apparatus as in claim 4 wherein:
   said valve guide assembly further comprises a flange extending generally at a right angle with respect to the longitudinal axis of said stem, said flange being mounted against the opening in said turbine housing, said valve guide assembly projecting into exhaust gas flow path, and
   said actuating means comprises a housing surrounding said stem and connected to said flange, said housing being pressurized with fluid for actuation, said first passage means being open to the interior of said housing.

* * * * *